United States Patent [19]

Busby et al.

[11] 3,967,969

[45] *July 6, 1976

[54] HIGH ZIRCONIA CONTAINING GLASS CERAMIC CEMENT

[75] Inventors: Terence Stanley Busby; Geoffrey Charles Cox, both of Sheffield, England

[73] Assignee: National Research Development Corporation, London, England

[ * ] Notice: The portion of the term of this patent subsequent to July 30, 1991, has been disclaimed.

[22] Filed: July 9, 1974

[21] Appl. No.: 486,754

Related U.S. Application Data

[63] Continuation-in-part of Ser. No. 253,669, May 1, 1972, Pat. No. 3,826,659.

[30] Foreign Application Priority Data

May 5, 1971 United Kingdom............... 13278/71
Nov. 27, 1971 United Kingdom............... 55157/71

[52] U.S. Cl.................................. 106/39.6; 106/53
[51] Int. Cl.²...................... C03C 3/22; C03C 3/04; C03C 3/12
[58] Field of Search............................ 106/39.6, 53

[56] References Cited
UNITED STATES PATENTS 3,826,659   7/1974   Busby et al. ...................... 106/39.6

Primary Examiner—Patrick P. Garvin
Assistant Examiner—Mark Bell
Attorney, Agent, or Firm—Finnegan, Henderson, Farabow & Garrett

[57] ABSTRACT

A glass ceramic cement comprising by weight 20% to 45% $ZrO_2$, 20% to 60% $Al_2O_3$, 0% to 27% $SiO_2$, 0% to 30% CaO, 0% to 10% $Na_2O$, the cement including at least one material selected from the group $B_2O_3$ and PbO, in the amounts up to 35% and 25% respectively, sufficient to assist in taking $ZrO_2$ into solution during the melting of said glass ceramic cement, $B_2O_3$ in the absence of PbO being in an amount more than 5%, PbO in the absence of $B_2O_3$ being in an amount more than 2%.

3 Claims, No Drawings

HIGH ZIRCONIA CONTAINING GLASS CERAMIC CEMENT

This application is a continuation-in-part of our application Ser. No. 253669 filed May 1, 1972, now U.S. Pat. No. 3,826,659.

This invention relates to glass ceramic cements and is particularly, but not exclusively, concerned with such cements and their application to glass tanks for the diminution of the wear that takes place on the tank sides at the joints in the tank formed from coursed blocks.

Excessive corrosion is known to occur at submerged horizontal joints when the width of the joint is greater than 0.25mm. In order to reduce this form of corrosion it is necessary to grind the mating faces and accurately lay the blocks. However, it is known that during the construction of a furnace, it is difficult to assemble the blocks such that the joint width is kept below 0.25mm, even with ground blocks, and it is known that blocks can move during the heating up of a furnace which would result in the joints opening up to the corrosive effect of molten glass.

According to the present invention, a glass ceramic cement comprises by weight 20% to 45% $ZrO_2$, 20% to 60% $Al_2O_3$, 0% to 27% $SiO_2$, 0% to 30% CaO, 0% to 10% $Na_2O$, the cement including $B_2O_3$ and/or PbO in the amounts up to 35% and 25% respectively, sufficient to assist in taking $ZrO_2$ into solution during the melting of said glass ceramic cement, $B_2O_3$ in the absence of PbO being in an amount more than 5%, PbO in the absence of $B_2O_3$ being in an amount more than 2%.

Preferably the cement comprises by weight 20% to 45% $ZrO_2$, 25% to 55% $Al_2O_3$, 2% to 27% $SiO_2$, 0% to 30% CaO, 0% to 10% $Na_2O$ the cement including $B_2O_3$ and/or PbO in the amounts 0% to 35% and 0% to 25% respectively.

It is further preferred that the cement comprises by weight 20% to 29% $ZrO_2$, 37% to 54% $Al_2O_3$, 8% to 27% $SiO_2$, 0% to 16% CaO, 0% to 2% $Na_2O$, and $B_2O_3$ and/or PbO in amounts up to 19% and 8% respectively.

The cements within the above specified ranges initially produced as a glass which is subsequently heat-treated to produce nucleation and crystallisation throughout the body to produce a semi-crystaline ceramic material in which the crystals are fine and homogeneously dispersed. Such ceramic cements have melting temperatures in the range 1500°C to 1850°C approximately.

Due to the relatively high melting temperatures of the material, the cement is eminently suited for use between coursed blocks in, e.g., a glass furnace wall and throat assembly. The subsequent heat treatment effects the nucleation and crystallisation necessary to convert the glass into a semi-crystalline ceramic.

To produce the cement there is first formed a batch of constituents which are heated until molten and then subjected to rapid cooling, e.g., by pouring into water, the resultant particulate glass being ground, e.g., in a ball mill. To facilitate the application of the cement, it is formed into a mortar of a suitable consistency by mixing it with a temporary bonding material, e.g., one having a cellulosic base and added water. In addition to the temporary bond, or if in suitable form instead of the temporary bond, a permanent bonding material may be introduced, with the exception of carbonaceous bonds (pitch and the like) and known bonding material for refractory materials may be used, such as phosphate bonding materials. Additionally, materials such as grog may be introduced having the advantage of introducing additional refractory materials into the mixture that promote further nucleation, and which reduce shrinkage particularly on subsequent firing. After the application of the cement to the joint between two blocks subsequent heating of the material, when the furnace is put into operation or initially preheated, results in the nucleation and crystallisation throughout the material to produce the semi crystalline glass ceramic joint. The temporary bonding material should also be capable of giving the material a green strength sufficient to hold the cement in place in the interim period where the material has been dried but a ceramic bond has not been produced.

At present, it is accepted practice to use soldier blocks (mono) in the construction of side walls of glass furnaces, except in very deep tanks when it is not economically feasible, with a view to eliminating the excessive corrosion known to occur at submerged horizontal joints. Also, since excessive corrosion is known to occur at the top of the block in the region of the glass surface, it is necessary to employ expensive fused cast zirconia/alumina/silica blocks. There are however other submerged horizontal joints within a glass tank such as at the throat assembly which cannot be easily eliminated by any means presently known.

With this in mind, the cement of the invention facilitates the use of multicourse side walls, the lower course(s) of which comprises less expensive refractory blocks, since corrosion is not as great further down the tank, when the working life of the furnace could be extended considerably because of the diminished rate of wear at the submerged horizontal joints where excessive corrosion is known to occur with a consequent reduction in the possibility of there being contamination of the glass which can be caused by corrosion of a joint, and also at any other joints of the glass furnace which may be intermittently contacted by molten glass and/or subjected to the corrosive nature of the furnace atmosphere.

The choice of a particular composition of cement within the broad range is dictated by the ultimate application of the cement because the refractoriness and the corrosion resistance can be varied. The following table 1 shows various examples of compositions within the broad range, all eminently suitable cements for application to a glass furnace.

|   | $ZrO_2$ | $Al_2O_3$ | $SiO_2$ | $B_2O_3$ | PbO | CaO | $Na_2O$ | Melting Temperature |
|---|---|---|---|---|---|---|---|---|
| 1 | 26 | 41 | 17 | 5 | 4 | 5 | 2 | 1690 |
| 2 | 25 | 39 | 25 | 4 | 1 | 6 | 2 | 1660 |
| 3 | 26 | 41 | 9 | 9 | 2 | 11 | 2 | 1660 |
| 4 | 26 | 38 | 9 | 9 | 2 | 14 | 2 | 1660 |
| 5 | 23 | 41 | 12 | 5 | 1 | 16 | 2 | 1630 |
| 6 | 25 | 46 | 8 | 19 | — | — | 2 | 1730 |
| 7 | 23 | 52 | 21 | — | 4 | — | — | 1760 |

-continued

| | $ZrO_2$ | $Al_2O_3$ | $SiO_2$ | $B_2O_3$ | PbO | CaO | $Na_2O$ | Melting Temperature |
|---|---|---|---|---|---|---|---|---|
| 8 | 23 | 50 | 20 | — | 2 | 5 | — | 1790 |
| 9 | 27 | 46 | 19 | — | 8 | — | — | 1780 |
| 10 | 24 | 53 | 19 | — | 4 | — | — | 1800 |
| 11 | 24 | 54 | 20 | — | 2 | — | — | 1800 |
| 12 | 27 | 37 | 27 | — | 4 | 5 | — | 1850 |
| 13 | 29 | 48 | 19 | — | 4 | — | — | 1800 |
| 14 | 33 | 46 | 2 | 17 | — | — | 2 | 1700 |
| 15 | 23.5 | 38.7 | 24.4 | 3.9 | 1.1 | 6.1 | 2.0 | 1750 |
| 16 | 21.2 | 40.5 | 13.0 | 9.5 | 2.5 | 12.0 | 1.3 | 1700 |
| 17 | 20.0 | 40.7 | 16.1 | 5.3 | 0.8 | 16.1 | 1.1 | 1700 |

The presence of high zirconia in the cement provides good resistance to corrosion and good refractoriness. By providing a relatively high alumina content there is again the enhancing of the refractoriness and an increase in the corrosion resistance. In addition the presence of alumina within the range stated assists in the formation of a glass. Silica within the range stated is believed to introduce a glass network formation into the material. The presence of boron or lead (or both) in the material assists in taking the zirconia into solution, and both act as fluxes tending to reduce the melting temperature as well as assisting in the promotion of glass formation. In addition to this, boron when present acts as a nucleating agent. Lime when present acts as a flux to take zirconia into solution and thereby assists the action of boron or lead (or both) that are present. Soda serves as a flux reducing the melting temperature of the material and also reacts with other constituents to form low melting point compounds.

To demonstrate the effectiveness of the cement of the invention in sealing joints in a glass tank, particularly submerged horizontal joints, a number of horizontal slots were cut into the refractory material of a laboratory glass tank, of substantially the same depth as a joint to be found in a commercial glass furnace. One such slot was left open to act as an open joint for comparison purposes. The slots were then filled with mortars formed from the cements of the Examples of the Table. The glass tank was then held for 3 months at 1450°C. On examination of the joints it was found that those filled with the cements according to the Examples exhibited corrosion that was less than 5% of the corrosion that was found in the open joint.

According to the precise amounts of constituents selected from the broad range, the temperature required to melt the cements can vary from approximately 1500°C to approximately 1850°C and the higher the temperature the more expensive is the material to produce. The amounts of the various constituents of the cements also determine the nature of the refractory phases that exist in the glass ceramic material and the amounts of glass phases that coexist with the refractory phases. Therefore, there is provided by the invention an ability to select cements from the broad range to suit the particular application to which it is to be put, i.e., it is only necessary to utilise the relatively expensive and highly refractory glass ceramics produced in accordance with the invention in conditions where excessively corrosive/erosive environments and/or high temperature conditions will be encountered, leaving the relatively less expensive and less refractory materials to be used in less arduous conditions.

What we claim is:

1. A glass ceramic cement comprising by weight 20% to 45% $ZrO_2$, 20% to 60% $Al_2O_3$, 0% to 27% $SiO_2$, 0% to 30% CaO, 0% to 10% $Na_2O$, the cement including at least one material selected from the group $B_2O_3$ and PbO, in the amounts up to 35% and 25% respectively, sufficient to assist in taking $ZrO_2$ into solution during the melting of said glass ceramic cement, $B_2O_3$ in the absence of PbO being in an amount more than 5%, PbO in the absence of $B_2O_3$ being in an amount more than 2%.

2. A glass ceramic cement as in claim 1, comprising by weight 20% to 45% $ZrO_2$, 25% to 55% $Al_2O_3$, 2% to 27% $SiO_2$, 0% to 30% CaO, 0% to 10% $Na_2O$ the cement including $B_2O_3$ and/or PbO in the amounts 0% to 35% and 0% to 25% respectively.

3. A glass ceramic cement as in claim 1, comprising by weight 20% to 29% $ZrO_2$, 37% to 54% $Al_2O_3$, 8% to 27% $SiO_2$, 0% to 16% CaO, 0% to 2% $Na_2O$, and $B_2O_3$ and/or PbO in amounts up to 19% and 8% respectively.

* * * * *